(12) United States Patent
Santoro

(10) Patent No.: US 8,042,783 B2
(45) Date of Patent: Oct. 25, 2011

(54) SUPPORTING AN ELECTRONIC DEVICE

(76) Inventor: Peter C. Santoro, Shirley, MA (US)

( * ) Notice: Subject to any disclaimer, the term of this patent is extended or adjusted under 35 U.S.C. 154(b) by 1184 days.

(21) Appl. No.: 11/609,601

(22) Filed: Dec. 12, 2006

(65) Prior Publication Data

US 2008/0135713 A1   Jun. 12, 2008

(51) Int. Cl.
A47B 91/00 (2006.01)
(52) U.S. Cl. .................. 248/346.03; 248/346.01
(58) Field of Classification Search .................. 108/123, 108/26, 50.02, 55.3, 176, 121, 125, 126, 108/129–131; 211/203; 248/310, 313, 346.03, 248/346.06, 346.3, 346.01, 677, 678, 511, 248/519
See application file for complete search history.

(56) References Cited

U.S. PATENT DOCUMENTS

| | | | |
|---|---|---|---|
| 2,512,828 A | 6/1950 | Collins | |
| 3,052,758 A | 9/1962 | Berry | |
| 3,125,181 A | 3/1964 | Pawlowski | |
| 3,299,206 A | 1/1967 | Klepper | |
| 4,031,318 A | 6/1977 | Pitre | |
| 4,042,778 A | 8/1977 | Clinton | |
| 4,267,405 A | 5/1981 | Russell | |
| 4,738,180 A | 4/1988 | McKnight | |
| 4,765,580 A | 8/1988 | Wright | |
| 4,797,633 A | 1/1989 | Humphrey | |
| 4,940,108 A | 7/1990 | Selby | |
| 5,042,070 A | 8/1991 | Linna et al. | |
| 5,121,812 A | 6/1992 | Ochiai et al. | |
| 5,309,518 A | 5/1994 | Icker et al. | |
| 5,328,291 A | 7/1994 | Wisniewski | |
| 5,340,066 A | 8/1994 | Ditch | |
| 5,588,063 A | 12/1996 | Edger | |
| 5,601,541 A | 2/1997 | Swisher | |
| 5,794,913 A | 8/1998 | Ho | |
| 5,802,190 A | 9/1998 | Ferren | |
| 5,852,545 A | 12/1998 | Pan-Ratzlaff et al. | |
| 5,917,923 A | 6/1999 | Caron | |
| 6,101,261 A | 8/2000 | Brown et al. | |
| 6,215,881 B1 | 4/2001 | Azima et al. | |
| 6,385,322 B1 | 5/2002 | Mietling | |
| 6,394,223 B1 | 5/2002 | Lehman | |
| 6,461,181 B1 | 10/2002 | Goh et al. | |
| 6,556,684 B1 | 4/2003 | Macey | |
| 2001/0029616 A1 | 10/2001 | Jin | |
| 2003/0174855 A1 | 9/2003 | Hawkins et al. | |
| 2004/0096074 A1 | 5/2004 | Bontempi et al. | |
| 2006/0000985 A1 | 1/2006 | Chandhok et al. | |

FOREIGN PATENT DOCUMENTS

| | | |
|---|---|---|
| EP | 0 593 191 | 4/1994 |
| EP | 0 791 279 | 2/1999 |
| EP | 1 199 907 | 4/2002 |
| EP | 1 494 502 | 1/2005 |
| GB | 1 187 462 | 4/1970 |
| JP | 06307107 | 1/1994 |

(Continued)

OTHER PUBLICATIONS

Hardcopy printout of website http://www.abtec.demon.co.uk.

(Continued)

Primary Examiner — Gwendolyn W Baxter
(74) Attorney, Agent, or Firm — Bose Corporation

(57) ABSTRACT

Among other things, a receptacle supports an electronic device; support legs connected to the receptacle are movable in a common plane between a first, retracted position and a second, extended position; and a coupling translates movement of one of the support legs between the positions to corresponding movement of at least another one of the support legs.

18 Claims, 7 Drawing Sheets

FOREIGN PATENT DOCUMENTS

| | | |
|---|---|---|
| JP | 06225379 | 12/1994 |
| JP | 11 243592 | 9/1999 |
| WO | WO 96/14723 | 5/1996 |

OTHER PUBLICATIONS

"Manufacturer's Showcase", Stereophile, Oct. 2000, p. 254 (advertisement).
Hardcopy printout of website http://www.nearfieldacoustics.com.
Hardcopy printout of website http://www.duran-audio.com.
Hardcopy printout of website http://www.audiotechnology.se.
Hardcopy printout of website http://www.omnya.com.
Briggs, G.A. (Ed. Cooke, Jr., R.E.) *Loudspeakers*, pp. 313-314, (c)May 1948.
Augspurger, G.L., "The Colinear Array—a Two-Way Loudspeaker System" (c)1970.
Smith, David L., "Discrete-Element Line Arrays—Their Modeling and Optimization", J. Audio Eng. Soc., vol. 45, No. 11, Nov. 1997, pp. 949-964.
Audio Reviews, "The Nearfield Acoustics PipeDreams: Ears Wide Open", The Sound, Issue 121, pp. 101-109.
Jordan, E.J., "Loudspeaker Enclosure Design", Wireless World, Jan. 1956, pp. 8-14; 75-79.
Jordan, E.J., "Multiple-Array Loudspeaker System", Wireless World, Mar. 1971, pp. 132-134.
Meyer, David G., "Multiple-Beam, Electronically Steered Line-Source Arrays for Sound-Reinforcement Applications," J. Audio Eng. Soc., vol. 38, No. 4, Apr. 1990, pp. 237-491.
Augspurger, G.L., et al. "An Improved Colinear Array".
Pawlowski, R. J., "The Line Radiator," Audio, Jul. 1961, pp. 19-21.
Eargle, J. et al. "Historical Perspective and Technology Overview of Loudspeakers for Sound Reinforcement," J. Audio Eng. Soc., vol. 52, No. 4, Apr. 2004.
International Search Report and Written Opinion dated May 16, 2008 from International Application No. PCT/US2007/087083.
International Report on Patentability dated Jun. 25, 2009 for PCT/US2007/087083.
EP Search dated Aug. 5, 2010 for EP Appln. No. 07865501.6-1252 / 2056697.
CN Office Action dated Jul. 26, 2010 for CN Appl. No. 200780043282.1.
CN Office Action dated May 10, 2011 for CN Appin. No. 200780043282.1.

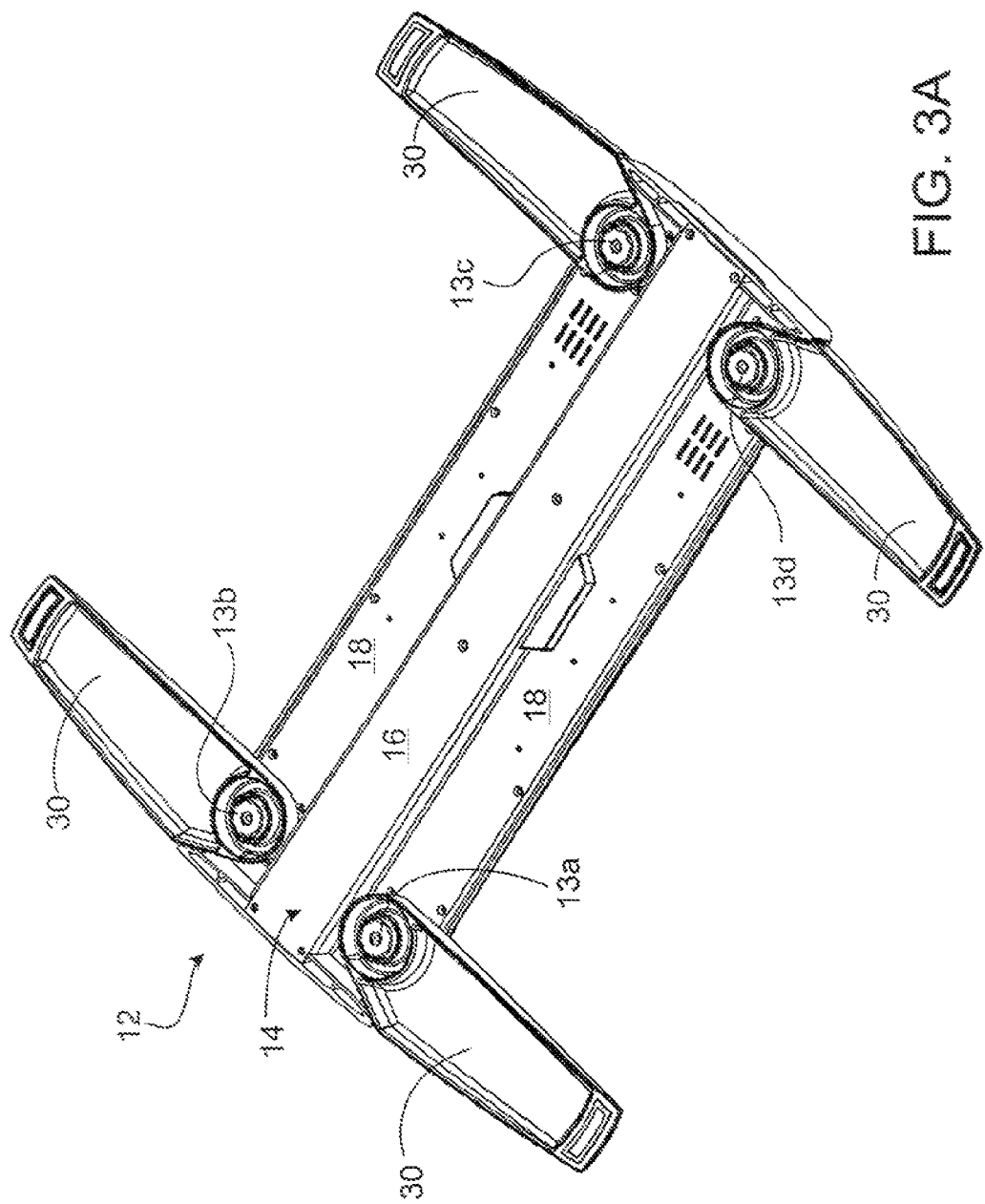

SUPPORTING AN ELECTRONIC DEVICE

BACKGROUND

This description relates to supporting an electronic device.

Stands for supporting audio, video, and other electronic equipment sometimes include legs. Tripods, for example, have three legs connected at a central hub on which the electronic equipment is mounted. The lower free ends of the legs are splayed out to provide stable support. In some tripods, all three legs can be collapsed by pivoting at the central hub, sometimes in a coordinated motion.

SUMMARY

In general, in an aspect, a receptacle supports an electronic device; support legs connected to the receptacle are movable in a common plane between a first, retracted position and a second, extended position; and a coupling translates movement of one of the support legs between the positions to corresponding movement of at least another one of the support legs.

Implementations may include one or more of the following features. The receptacle inhibits insertion of the electronic device into the receptacle when the support legs are in the first, retracted position. Movement of the support legs between the extended position and the retracted position is inhibited when the electronic device is supported by the receptacle. The coupling includes: a link plate and linkage arms, and each of the linkage arms has a first end mounted to the link plate and a second end mounted to a corresponding one of the support legs. The link plate is linearly displaceable relative to the receptacle. The support legs lie in a common plane. The electronic device includes a loudspeaker. The support includes electronics operable to control one or more aspects of the electronic device. The electronics include one or more of an audio control circuit, an amplifier, and an equalizer. The electronics include an electrical connector on the receptacle, and the electronics are configured to communicate with the electronic device through the electrical connector. The receptacle is keyed to the electronic device.

In general, in an aspect, an electronic device is supported by extending one of multiple support legs of a support device from a retracted position toward an extended position to cause corresponding and co-planar movement of at least one other support leg, and a mating electronic device is inserted into a corresponding receptacle of the support device.

In general, in an aspect, a receptacle to support an electronic device; support legs are movable in a common plane between a first, retracted position and a second, extended position; and a lockout mechanism limit operations of the device based on a condition of the receptacle.

Implementations may include one or more of the following features. The lockout mechanism prevents insertion of the electronic device into the receptacle when the support legs are in the first, retracted position. The lockout mechanism includes a stopper that extends into the receptacle when the support legs are in the first, retracted position. The lockout mechanism prevents movement of the support legs from the extended position toward the retracted position when the electronic device is disposed in the receptacle. A deployment mechanism responds to movement of a first one of the support legs between the positions by causing corresponding movement of another one of the support legs.

These aspects and features and other combinations of these and other aspects and features can be expressed as methods, apparatus, systems, and as means for performing functions, and in other ways.

Other features and advantages will be apparent from the description and the claims.

DESCRIPTION

FIG. 3A is a bottom perspective view of a support stand.

DETAILED DESCRIPTION

Figure 1:
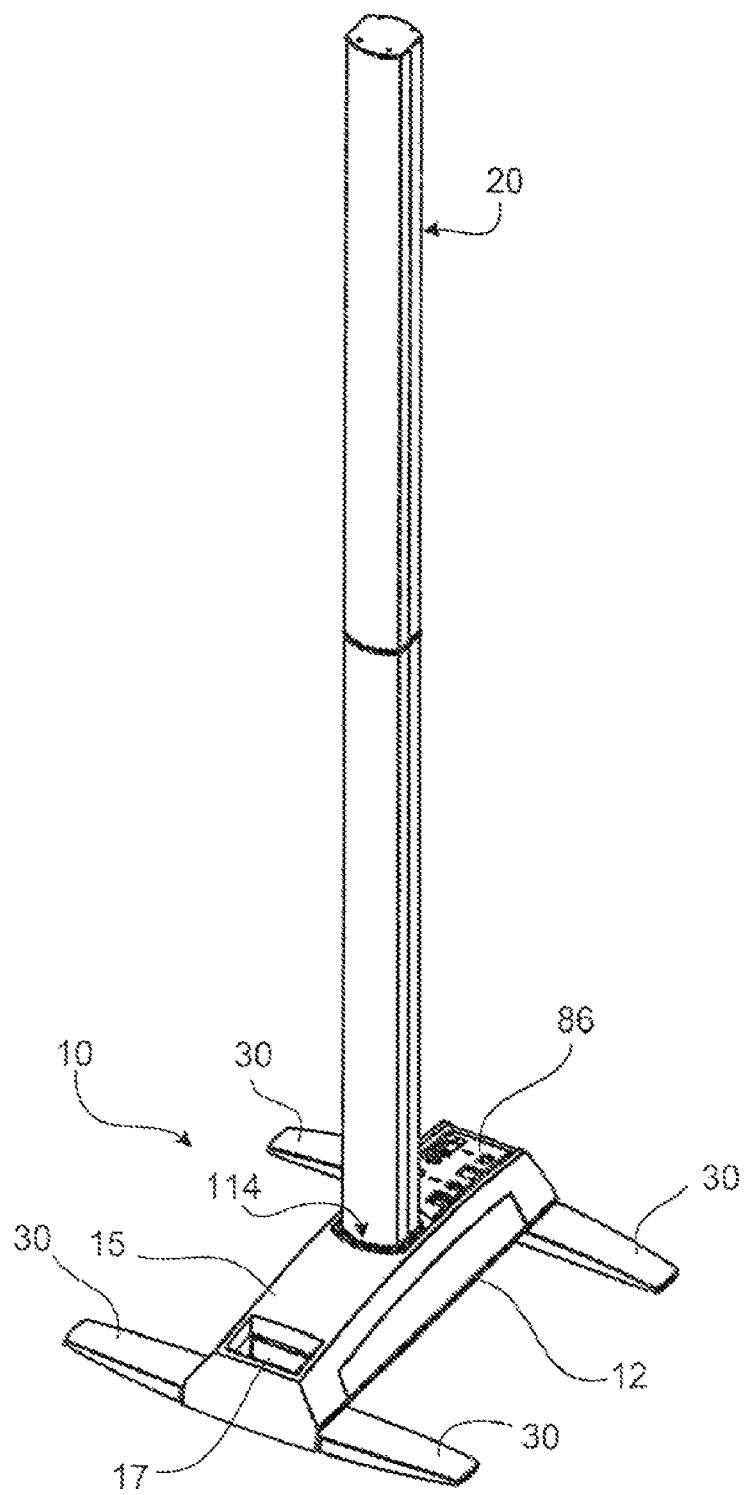
FIG. 1 is a perspective view of a support stand and an electronic device.
Figure 2C:
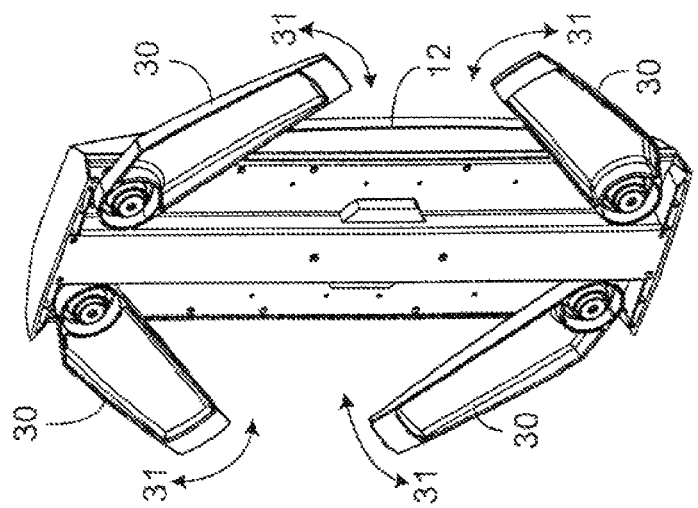
FIG. 2A through 2C are bottom, top, and perspective views of a support stand.
Figure 2B:
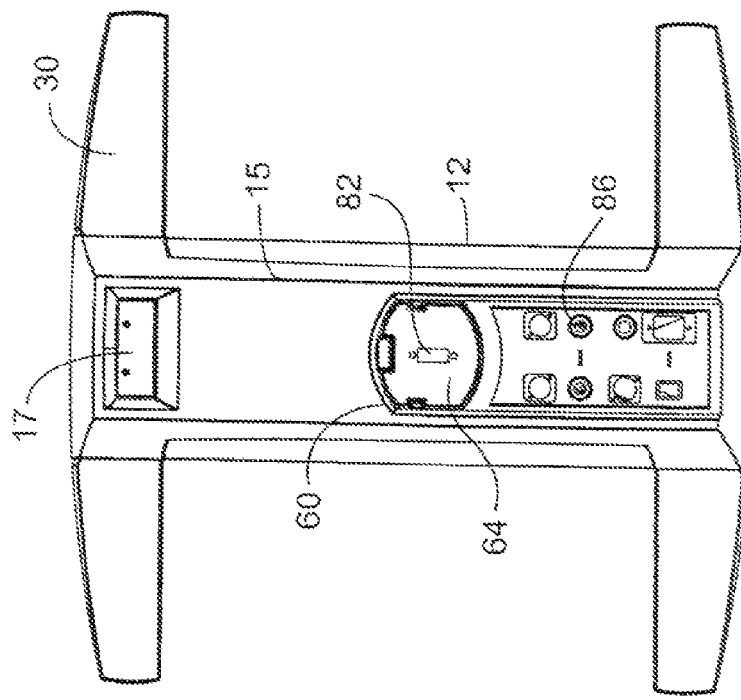
Figure 2A:
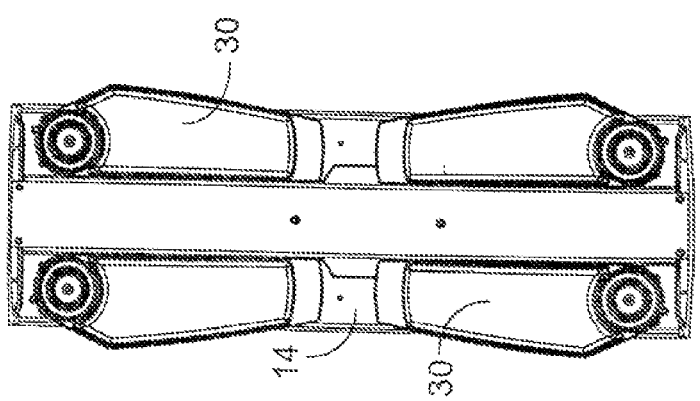

Referring to FIGS. 1, 2A, 2B, and 2C, a support stand 10 for an electronic device 20 (e.g., a floor standing personal amplification system including a line array loudspeaker such as sold under the trade name Cylindrical Radiator® by Bose Corporation of Framingham, Mass.; and other described in United States patent application publications 2004/0264726, filed Jun. 30, 2003, and 2004/0264716 filed Jun. 30, 2003, both of which are incorporated here by reference in their entirety) includes an oblong base 12 and a plurality of (four in the example) support legs 30 at the four corners of the base. Each of the support legs 30 is moveable, relative to the base 12, between a retracted position (FIG. 2A) and an extended position (FIG. 2B). All four support legs 30 are mechanically linked to induce synchronized movement of all four support legs 30 in a common plane so that movement of one of the support legs 30 between the two positions causes simultaneous corresponding movement of the other support legs 30 as indicated by arrows 31 in FIG. 2C. In the retracted position each of the legs lies in a position substantially within the footprint defined by the base. Thus, when the legs are in the retracted position, the stand is more compact and can be more easily transported and stored. When the stand is to be used, the support legs 30 are moved to the extended position and lie in a common plane close to the ground, providing stable support to the stand and the electronic device mounted on it. For storage or transport, the legs are moved to their retracted position.

Figure 3B:
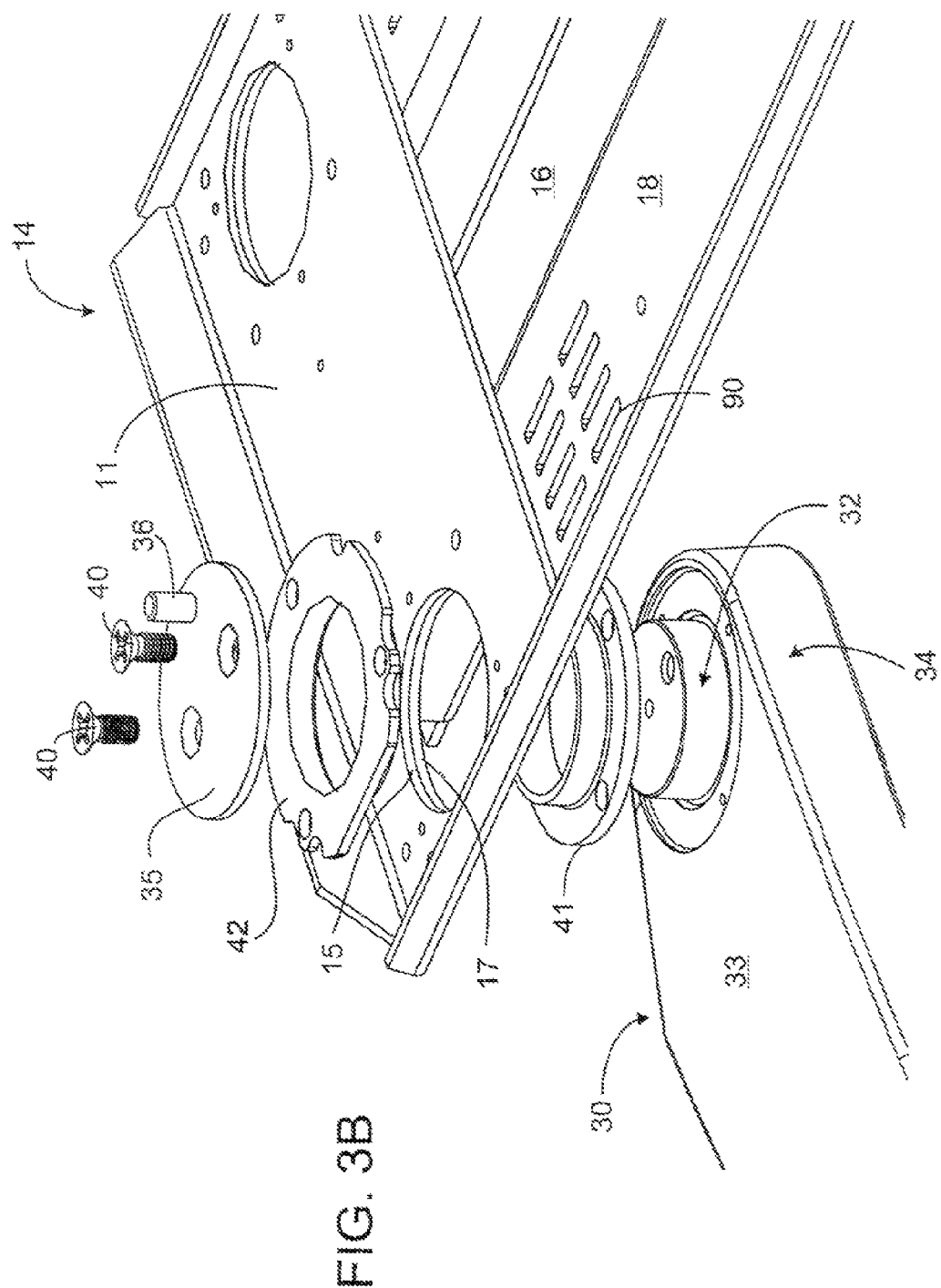
FIG. 3B is a partial exploded perspective view of a portion of a support stand.

As shown, for example, in FIGS. 3A-3B, the base 12 is an assembly that includes a chassis 14 (e.g., a metal chassis) having a central support bar 16, overhanging ridges 18 extending laterally from the central support bar 16, and a cover plate 11 (FIG. 3B). The support legs 30 (each of which is made of plastic and/or metal) are mounted for rotation at points 13a-d on the overhanging ridges 18 at the corners of the base. As shown in FIG. 3B, each of the support legs 30 includes a cylindrical pivot 32 that projects from a first surface 33 at one end 34 of the leg 30. Each pivot 32 extends through corresponding holes 15, 17 in the cover plate 11 and overhanging ridges 18 of the chassis 14. A mounting plate 35 is attached to the tip of the cylindrical pivot 32 (i.e., using a mechanical fasteners 40 to transfer rotation of the support leg 30 into rotation of the mounting plate 35). Bushings 41 and 42 are provided at the mating surfaces between the support leg 30, the chassis 14, and the mounting plate 35 to permit free rotation. The mounting plate 35 includes a protuberance 36 which forms a connection with a deployment mechanism 50 (FIGS. 4A and 4B) to transfer rotation of the support leg 30 to the deployment mechanism 50.

Figure 4A:
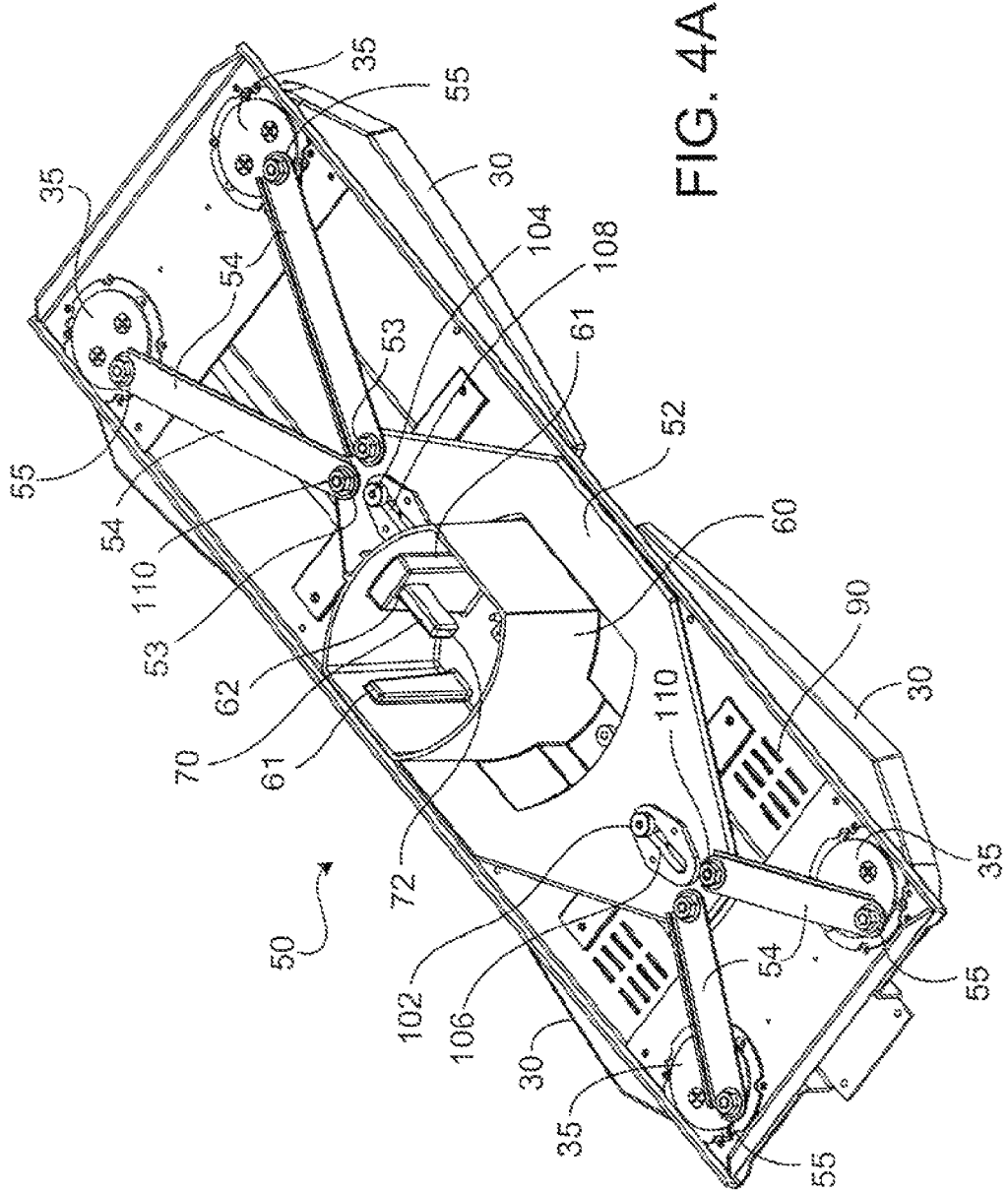
FIGS. 4A and 4B are top perspective views of portions of a support stand.
Figure 4B:
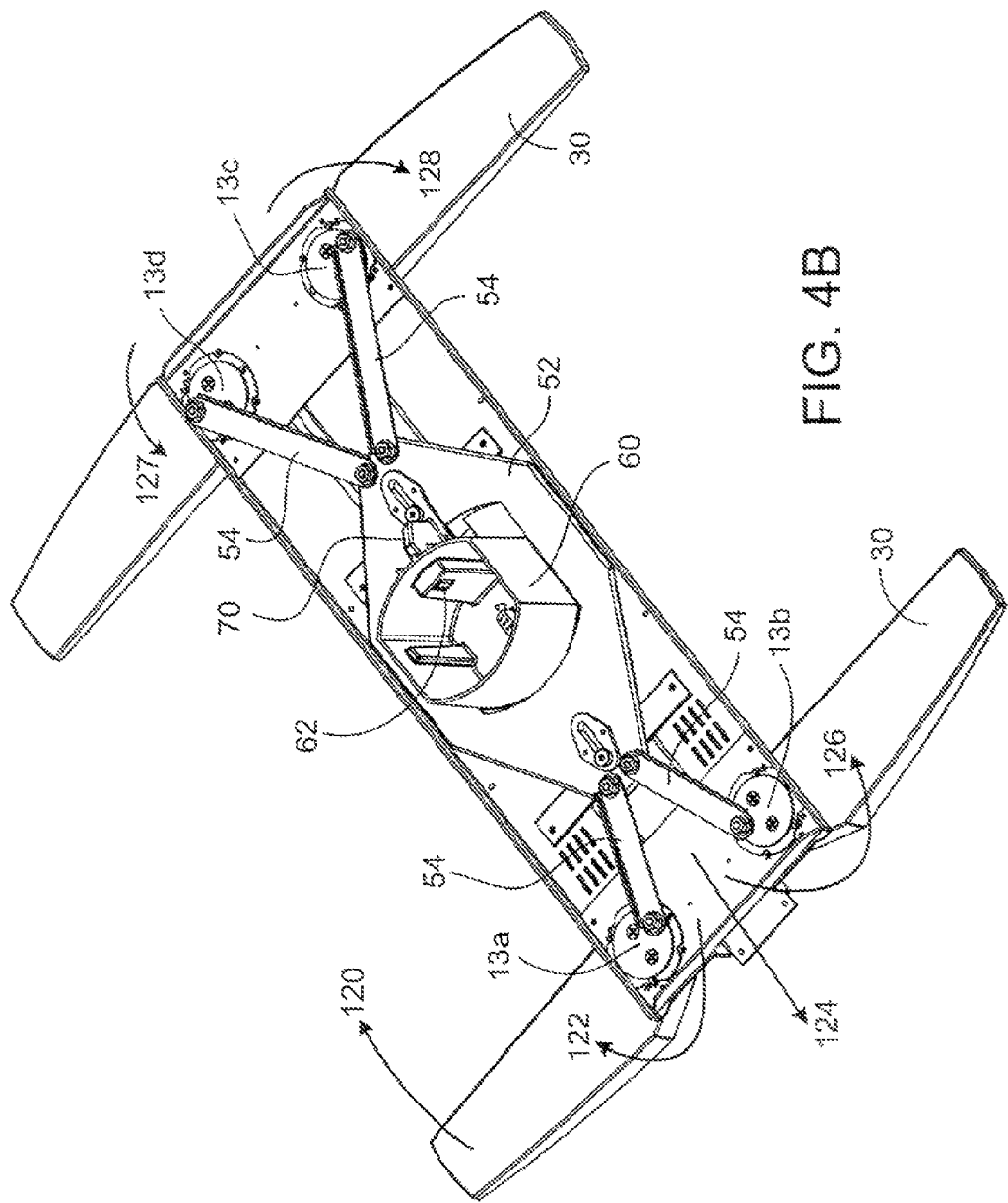

Referring to FIGS. 4A and 4B, the deployment mechanism 50, on the other side of chassis 14 from the legs, provides for synchronized movement of the support legs 30. Specifically, the deployment mechanism 50 includes a link plate 52 mounted on the topside of the cover plate 11 of the chassis 14 using shoulder screws 102, 104 that ride in slots 106, 108, and four linkage arms 54, one for each leg. Each of the linkage arms 54 includes one end 53 attached to the link plate 52 using a nut 110 and another end 55 attached to the protuberance 36 of the mounting plate 35 of a corresponding one of the support legs 30. When one of the support legs 30 is rotated (as indicated by arrow 120 of FIG. 4B) it drives the end 55 of the corresponding linkage arm 54 radially about point 13a, as indicated by arrow 122. Because the end 55 is mounted off-center from the center of rotation of the support leg 30, rotation of the leg 30 is translated into a cam-like movement of the linkage arm 54 at the end 55, which, in turn, exerts a force on the link plate 52 at the end 53 causing linear displacement of the link plate 52, as indicated by arrow 124. The linear movement of the link plate 52 exerts a force (in the direction of arrow 124) at ends 53 of the other linkage arms 54, which, in turn, is transferred to the ends 55 resulting in rotation (i.e., about points 13b-13d, as indicated by arrows 126, 127, 128) of the other support legs 30.

The support stand 10 also includes a receptacle 60 to mate with and support a bottom end 114 (FIG. 1) of the electronic device 20 (FIG. 1). The receptacle 60 is mounted to the chassis 14 and is shaped to conform roughly to the shape of the outer surface of the bottom of the electronic device 20. The receptacle 60 can include keys 61 to form lock-and-key type interfaces with lock surfaces (not shown) on the bottom end of the electronic device 20; i.e., to require the electronic device 20 to be supported in a particular orientation.

The support stand 10 can also include a lockout mechanism 70 for preventing or inhibiting insertion of the electronic device 20 into the receptacle 60 unless and/or until the support legs 30 are in the fully extended position (FIG. 4B), and preventing or inhibiting retraction of the support legs 30 (i.e., from the extended position (FIG. 4B) toward the retracted position (FIG. 4A)) unless and/or until the electronic device 20 is removed from the receptacle 60. As illustrated in FIGS. 4A and 4B, the lockout mechanism 70 is connected to the link plate 52 and operated by movement of the link plate 52 as the support legs 30 are moved between the retracted and extended positions. As shown, for example, in FIG. 4A, the lockout mechanism 70 includes a stopper 72 which extends into the receptacle 60 (i.e., through aperture 62) when the support legs 30, and deployment mechanism 50, are in the retracted position (FIG. 4A), thereby preventing insertion of the electronic device 20. When the support legs 30 are moved into the extended position, as shown in FIG. 4B, the corresponding movement of the link plate 52 displaces the stopper 72 to a position outside of the receptacle 60, allowing the electronic device 20 to be inserted. Furthermore, the presence of the electronic device 20 in the receptacle 60 prevents the stopper 72 from reentering the receptacle 60 and, as result, prevents retraction of the support legs 30 as long as the electronic device is inserted.

Figure 5:
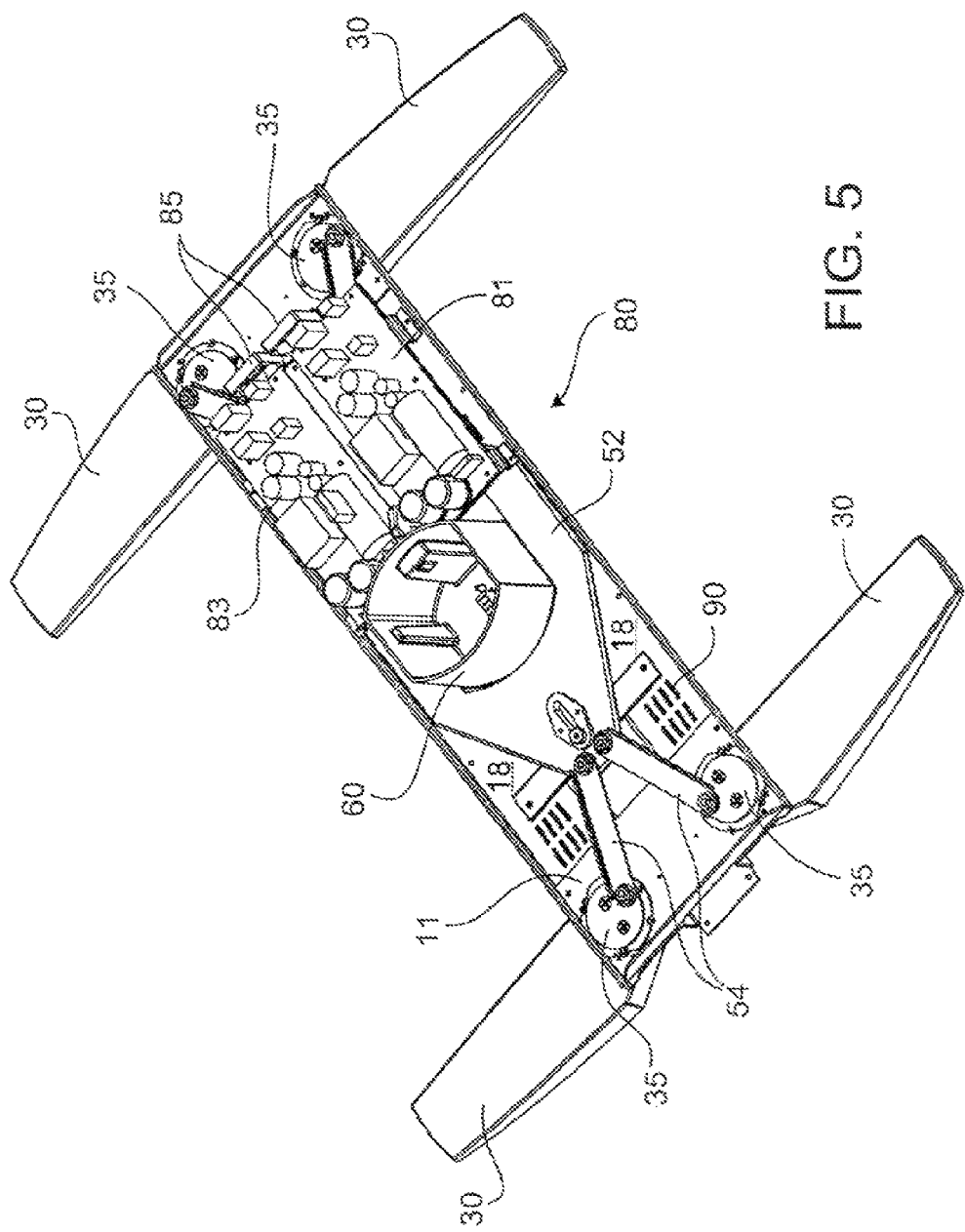
FIG. 5 is a top perspective view of a portion of a support stand.

As shown in FIG. 5, the support stand 10 can also include electronics 80 mounted on two circuit boards 81, and 83, for example, an audio control circuit, an amplified, and/or an equalizer to be used with the electronic device 20. The control electronics 80 can include an electrical connector 82, shown in FIG. 2B, disposed at a bottom surface 64 of the receptacle 60. The electrical connector 82 provides an interface for communication with the electronic device 20 (e.g., through a mating connector).

As shown in the drawings and described above, the support stand 10 is arranged as multiple layers of subassemblies. For example, the deployment mechanism 50 is disposed between the circuit boards 81, and 83 of the electronics 80 and the cover plate 11 of the chassis. Similarly, the chassis, or at least the cover plate 11 and overhanging ridges 18 of the chassis 11, form a layer between the support legs 30 and the deployment mechanism.

Other embodiments are within the scope of the following claims.

For example, in some embodiments, the support stand can include a user interface 86 (FIGS. 1 and 2B) (e.g., in communication with the control electronics) for controlling operation of the electronic device based on a user input. In some implementations, the user interface can include an input/output (I/O) panel for communication with one or more secondary devices, such as microphones and musical equipment (e.g., instruments, recording equipment, etc.). The I/O panel can include, for example, a primary input channel connection for receiving an input signal from a secondary device; an input trim control for input level adjustment for the secondary device; a preset selector (e.g., for selecting between predetermined parameter settings, each specific to a corresponding secondary device); a line out connector (e.g., for connecting the electronics to external recording equipment); channel insert jacks (e.g., for connecting the electronics to digital effects processors; one or more I/O jacks for linking the electronics of multiple support stands together (i.e., for communication between two or more support stands); a remote connector for connecting the electronic to a remote control; a main power connector (e.g., for connecting to a 120V, 15V power source; and/or a power on/off switch for switching electrical power to the electronics on and off.

While the support stands described above include support legs that are rotatable between the retracted and extended positions, other embodiments can include support legs that are movable linearly between extended and retracted positions. For example, in some embodiments, the support legs can include telescoping members that are extendable, in a substantially linear direction, outward from chassis (and collapsible inward, towards the chassis).

In some implementations, the base 12 can include a housing 15 (FIGS. 1 and 2B) that overlies the electronics and/or deployment mechanism. In some embodiments, the housing 15 and/or chassis 14 include(s) a carry handle 17 (FIGS. 1 and 2B) for portability. In some implementations, the carry handle 17 is disposed on the support stand so as to urge the link plate towards the retracted position when the support stand is lifted by the carry handle 17.

In some embodiments, the electronics include fans 85 (FIG. 5) to provide an air flow across the electronics (i.e., for convective cooling of electronic components). The chassis and/or housing can also include vents 90 (e.g., defined by the overhanging ridges, as shown, for example, in FIG. 3B) to allow for passage of an air flow through the support stand.

What is claimed is:

1. Apparatus comprising:
   a receptacle to support an electronic device;
   support legs connected to the receptacle and movable in a common plane between a first, retracted position and a second, extended position; and
   a coupling that translates movement of one of the support legs between the positions to corresponding movement of at least another one of the support legs, wherein the receptacle inhibits insertion of the electronic device into the receptacle when the support legs are in the first, retracted position.

2. The apparatus according to claim 1, in which movement of the support legs between the extended position and the retracted position is inhibited when the electronic device is supported by the receptacle.

3. The apparatus according to claim 1, in which the coupling comprises:
   a link plate; and
   linkage arms, each of the linkage arms having a first end mounted to the link plate and a second end mounted to a corresponding one of the support legs.

4. The apparatus according to claim 3, in which the link plate is linearly displaceable relative to the receptacle.

5. The apparatus according to claim 1, in which the support legs lie in the common plane.

6. The apparatus of claim 1 also including the electronic device.

7. The apparatus according to claim 6, in which the electronic device comprises a loudspeaker.

8. The apparatus according to claim 7, further including electronics operable to control one or more aspects of the electronic device.

9. The apparatus according to claim 8, in which the electronics comprise one or more of an audio control circuit, an amplifier, and an equalizer.

10. The apparatus according to claim 8, in which the electronics include an electrical connector on the receptacle; and in which the electronics are configured to communicate with the electronic device through the electrical connector.

11. The apparatus according to claim 10, in which the receptacle is keyed to the electronic device.

12. Apparatus comprising:
    a receptacle to support an electronic device;
    support legs connected to the receptacle and movable in a common plane between a first, retracted position and a second, extended position; and
    a lockout mechanism that interacts with the receptacle to limit operation of the device based on a condition of the receptacle, wherein the lockout mechanism prevents insertion of the electronic device into the receptacle when the support legs are in the first, retracted position.

13. The apparatus according to claim 12, in which the lockout mechanism includes a stopper that extends into the receptacle when the support legs are in the first, retracted position.

14. The apparatus according to claim 12, in which the lockout mechanism prevents movement of the support legs from the extended position toward the retracted position when the electronic device is disposed in the receptacle.

15. The apparatus according to claim 12, further comprising a deployment mechanism that responds to movement of a first one of the support legs between the positions by causing corresponding movement of another one of the support legs.

16. The apparatus according to claim 12, further comprising a deployment mechanism that responds to movement of a first one of the support legs between the positions by causing corresponding movement of another one of the support legs.

17. Apparatus comprising:
    a receptacle to support an electronic device;
    support legs connected to the receptacle and movable in a common plane between a first, retracted position and a second, extended position; and
    a lockout mechanism that interacts with the receptacle to limit operation of the device based on a condition of the receptacle, in which the lockout mechanism prevents movement of the support legs from the extended position toward the retracted position when the electronic device is disposed in the receptacle, wherein the lockout mechanism prevents insertion of the electronic device into the receptacle when the support legs are in the first, retracted position.

18. The apparatus according to claim 17, in which the lockout mechanism includes a stopper that extends into the receptacle when the support legs are in the first, retracted position.

* * * * *